United States Patent
Gatti et al.

(10) Patent No.: US 11,517,142 B2
(45) Date of Patent: Dec. 6, 2022

(54) GROUP FOR SUPPLYING HOT WATER FOR A MACHINE FOR MAKING ESPRESSO COFFEE OR THE LIKE AND ASSOCIATED MACHINE

(71) Applicant: La Marzocco S.r.l., Scarperia (IT)

(72) Inventors: Riccardo Gatti, Scarperia (IT); Massimiliano Baldaccioni, Scarperia (IT)

(73) Assignee: LA MARZOCCO S.R.L., Scarperia (IT)

(*) Notice: Subject to any disclaimer, the term of this patent is extended or adjusted under 35 U.S.C. 154(b) by 596 days.

(21) Appl. No.: 15/542,407

(22) PCT Filed: Feb. 24, 2016

(86) PCT No.: PCT/EP2016/053894
§ 371 (c)(1),
(2) Date: Jul. 7, 2017

(87) PCT Pub. No.: WO2016/135212
PCT Pub. Date: Sep. 1, 2016

(65) Prior Publication Data
US 2018/0271319 A1    Sep. 27, 2018

(30) Foreign Application Priority Data

Feb. 25, 2015   (IT) .......................... 102015000006957

(51) Int. Cl.
*A47J 31/46* (2006.01)
*A47J 31/54* (2006.01)
*A47J 31/36* (2006.01)
*A47J 31/56* (2006.01)

(52) U.S. Cl.
CPC .......... *A47J 31/465* (2013.01); *A47J 31/3685* (2013.01); *A47J 31/542* (2013.01); *A47J 31/56* (2013.01)

(58) Field of Classification Search
CPC ........ A47J 31/465; A47J 31/56; A47J 31/407; A47J 31/4403; A47J 31/46; A47J 31/5253;
(Continued)

(56) References Cited

U.S. PATENT DOCUMENTS

| | | | | |
|---|---|---|---|---|
| 6,058,986 A | * | 5/2000 | Bethuy | B67D 1/1238 137/392 |
| 6,611,660 B1 | * | 8/2003 | Sagal | F28F 1/124 219/546 |
| 7,461,585 B2 | * | 12/2008 | Nenov | A47J 31/005 99/282 |
| 8,663,724 B1 | * | 3/2014 | Banasik | A47J 31/0631 426/433 |

(Continued)

FOREIGN PATENT DOCUMENTS

| | | | |
|---|---|---|---|
| CN | 104080379 A | * | 10/2014 |
| CN | 104080379 A | | 10/2014 |

(Continued)

OTHER PUBLICATIONS

International Search Report and Written Opinion dated Jun. 9, 2016, issued in corresponding Application No. PCT/EP2016/053894, filed Feb. 24, 2016, 9 pages.

*Primary Examiner* — Justin C Dodson
(74) *Attorney, Agent, or Firm* — Nixon & Vanderhye P.C.

(57) ABSTRACT

A group (6) for supplying hot water in a machine for preparing and dispensing a beverage, for example espresso coffee, comprising: a water accumulation chamber (14) with an inlet (11) for receiving water and an outlet (12); and a heating path (9, 13). The heating path comprises an inlet for (Continued)

receiving water from the outlet (12) of the accumulation chamber (14) and an outlet (15) for dispensing heated water into a brewing chamber (16) for preparing a beverage. The heating path comprises a path bounded by a heatable outer surface (13) and an inner core (9). The inner core (9) comprises a temperature probe (8) located in proximity of the outlet (15) for dispensing heated water.

12 Claims, 7 Drawing Sheets

(58) Field of Classification Search
CPC .. A47J 31/461; A47J 31/0642; A47J 31/3695; A47J 31/0573; A47J 31/4478; A47J 31/545; A47J 31/106; A47J 31/0652; A47J 31/0678; A47J 2201/00; A47J 27/21008; A47J 27/2105; A47J 27/21166; B67D 1/0046; B67D 1/0869; B67D 2001/0093; B67D 2210/00118; Y10T 137/6416; F16K 11/027; F16K 15/063; F16K 19/00; F16K 19/006; F16K 27/0209; F24H 1/121; F24H 1/10; F24H 1/101; F24H 1/105; F24H 1/122; F24H 1/142; F24H 15/25; F28D 7/082; H05B 2203/013; H05B 2203/021; H05B 3/48; H05B 3/68
USPC ...... 99/281, 280, 300, 288, 323.3, 316, 317, 99/331, 451; 426/115; 122/14.3; 219/442, 494, 146.5; 392/397, 441, 450, 392/451, 465, 490, 493

See application file for complete search history.

(56) References Cited

U.S. PATENT DOCUMENTS

| | | | |
|---|---|---|---|
| 2005/0011364 A1 | 1/2005 | Chen et al. | |
| 2010/0003022 A1 | 1/2010 | Rehanloo | |
| 2010/0005971 A1* | 1/2010 | Faccinti | A47J 31/36 |
| | | | 99/281 |
| 2010/0018407 A1 | 1/2010 | Liu | |
| 2010/0218684 A1* | 9/2010 | Etter | A47J 31/407 |
| | | | 174/254 |
| 2010/0282090 A1* | 11/2010 | Etter | A47J 31/542 |
| | | | 99/288 |
| 2012/0090474 A1 | 4/2012 | Carbonini et al. | |
| 2012/0121780 A1 | 5/2012 | Lai et al. | |
| 2014/0352543 A1* | 12/2014 | Boni | A47J 31/542 |
| | | | 99/281 |

FOREIGN PATENT DOCUMENTS

| | | | |
|---|---|---|---|
| EP | 1 886 605 A1 | 2/2008 | |
| EP | 2 218 374 A2 | 8/2010 | |
| FR | 2971134 A1 * | 8/2012 | ......... A47J 31/3671 |
| JP | 2005-040605 A | 2/2005 | |
| JP | 2009-537260 A | 10/2009 | |
| JP | 2014-506820 A | 3/2014 | |

* cited by examiner

GROUP FOR SUPPLYING HOT WATER FOR A MACHINE FOR MAKING ESPRESSO COFFEE OR THE LIKE AND ASSOCIATED MACHINE

The present invention relates in general to the sector of machines for preparing beverages. More particularly, it relates to a group for supplying hot water for a machine for making espresso (or other beverage). The present invention also relates to a machine for making espresso (or other beverage) comprising such a hot water supplying group.

EP 2 070 457 relates to a machine for preparing coffee or the like, comprising hydraulic pumping means for the controlled supplying of a flow of water, at least one group for preparing and dispensing the coffee or the like, with at least one dispensing seat, said group comprising an electric heater located upstream of said seat and designed to heat up to a predetermined temperature a flow of water passing through it; a hydraulic circuit which connects the pumping means to the inlet of said heater and which comprises solenoid valve means able to assume a rest configuration where said heater is essentially emptied of water and a working configuration where the heater is enabled to receive and be passed through by a flow of water conveyed by the pumping means for preparation of the coffee or the like; and control means designed to activate the heater and cause switching of said solenoid valve means into the working configuration only when a command for preparation and dispensing of coffee or the like is imparted, wherein said group, situated hydraulically upstream of the heater, contains a chamber which is in a heat-exchanging relationship with the heater and is designed to preheat a flow of water directed towards said heater. The machine also comprises a hot steam generating group. The solenoid valve means are designed to assume a further working configuration where said heater is disabled from receiving the flow of water conveyed by the pumping means and where said chamber is connected to the inlet of the steam generating group so that the latter is enabled to receive the flow of water supplied by the pumping means and passing through said chamber.

The proposed aim of the Applicant is that of providing a group for supplying hot water in a machine for making espresso coffee (or other beverage), which is able to supply rapidly, and in a stable and predictable manner, water heated to a desired temperature.

According to the present invention, a group for supplying hot water in a machine for making espresso coffee (or other beverage) is provided, wherein the water is forced to flow along a winding path which can be heated, as far as a temperature probe situated in proximity of a dispensing point.

According to a first aspect, the present invention relates to a group for supplying hot water in a machine for preparing and dispensing a beverage, for example espresso coffee, comprising:
  a water accumulation chamber, wherein said accumulation chamber comprises an inlet for receiving water and an outlet and
  a heating path,
  wherein said heating path comprises an inlet for receiving water from the outlet of said accumulation chamber and an outlet for dispensing heated water into a brewing chamber for preparing a beverage,
  wherein said heating path comprises a path bounded by a heatable outer surface and an inner core,
  wherein said inner core comprises a temperature probe for detecting a temperature of the heated water, and
  wherein the inner core comprises a longitudinal axis, a first end at the inlet of the heating path and a second opposite end; the temperature probe is housed in a seat which extends longitudinally inside the core from the second end towards the first end so that the temperature probe detects the temperature of the water in proximity of the outlet.

The position and the manner in which the probe is inserted in the core offers numerous advantages.

Firstly, the temperature probe, owing to the fact that it is inserted inside the core, does not modify or influence the flow of water along the winding path.

Secondly, the temperature probe is not in direct contact with the water and therefore is not affected by the presence of any limescale encrustations or the like. Therefore, its efficiency and duration over time are greatly increased. Basically, the water heated in turn heats the wall (which is relatively thin) between the outer surface of the core and the seat where the temperature sensor is housed. In this way, the heat of this wall is transferred to the temperature sensor in its seat.

Thirdly, the temperature probe is able to detect the temperature of the water in proximity of the outlet of the winding path. Therefore, owing to the present invention, the temperature of the water is sensed and checked immediately before it reaches the brewing chamber.

The heating path is preferably a winding path which may be formed at least partially by a helical surface.

In one embodiment, the helical surface is at least partly formed on an outer surface of the inner core.

Preferably, the heating path extends completely outside of the core without ever passing through it. On the other hand, in known solutions, entry of the water before starting to flow along a heating path was through a transverse hole in the core. This, along with other negative aspect, prevents complete emptying of the supply path when the machine is not being used.

Preferably, the heating path comprises a substantially cylindrical surface around said helical surface, wherein said substantially cylindrical surface is the surface of a hole in a solid body.

In one embodiment, the group also comprises a solenoid valve between the outlet of the accumulation chamber and the inlet of the winding path.

The inlet of the accumulation chamber is preferably at a different height than the outlet, and/or the axis of the inlet of said accumulation chamber is substantially perpendicular to the axis of the outlet of the accumulation chamber.

The group may also comprise a diffuser which is removable and can be interchanged with other diffusers having different forms such as to render the group modular and capable of extracting different types of beverages from powder, pods, capsules or the like.

The group may also comprise a lever rotatable in a first direction so as to start a beverage extraction cycle and in a second direction so as to stop the beverage extraction cycle.

According to a second aspect, the present invention relates to a machine for preparing and dispensing a beverage, for example espresso coffee, comprising: a group supplying hot water of the aforementioned type and a pump for feeding water to said group.

In one embodiment, the machine further comprises a steam boiler and a preheater for preheating water supplied by said pump, by means of heat generated by said steam boiler, and for feeding preheated water to said group.

The machine may also comprise means for discharging the water from the winding path.

In one embodiment, the machine may further comprise a processing group, CPU, which receives temperature information from the probe and controls, in a corresponding manner, heating elements of the group.

The CPU, by means of control systems, for example of the PID (Proportional, Integral, Derivative) type, manages and controls electronically the activation of the heating elements 7 present inside the group 6 in order to obtain the temperature of the water at the desired temperature value.

The processing group may also be programmed so that, when a user activates the dispensing of hot water for brewing, switching-on of the pump is delayed for a certain time period; during this time period only the load passage of the solenoid valve is opened.

The present invention will become clearer from the following description, provided by way of a non-limiting example, to be read with reference to the accompanying drawings, in which.

Figure 1:
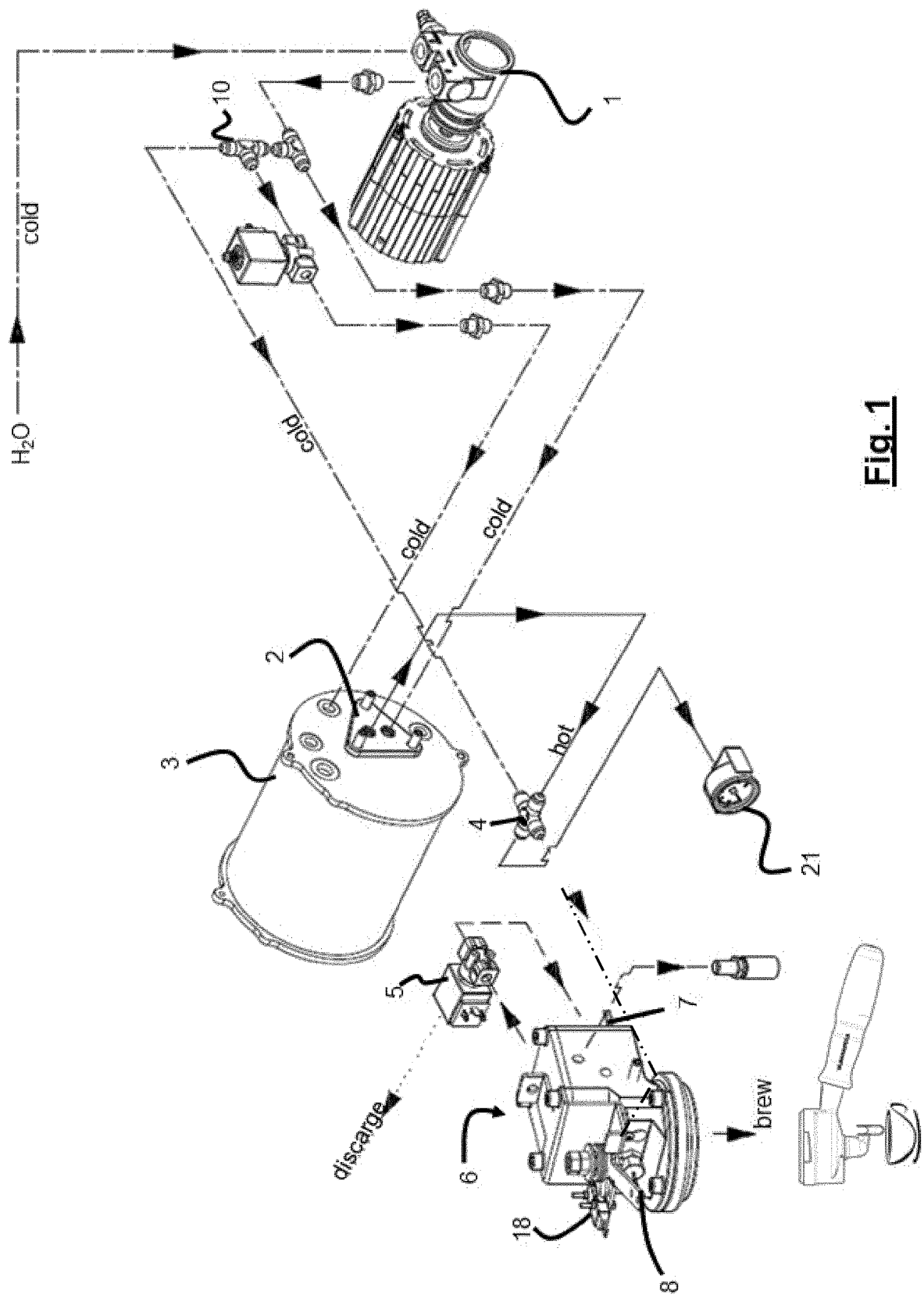
FIG. 1 shows, in schematic form, the hydraulic circuit of a machine for preparing and dispensing a beverage according to an embodiment of the present invention.

FIG. 1 shows, in schematic form, a hydraulic circuit of a machine for preparing and dispensing a beverage according to an embodiment of the present invention. The symbols used consist of dash-dot lines for indicating the cold water, solid lines for indicating the heated water, dash-dot-dot lines for indicating the mixed water, dashed lines for indicating the water at the dispensing temperature and dotted lines for indicating the discharge water.

The description below, for the sake of convenience, refers in particular to an espresso coffee machine, but the present invention is not limited to such machines and is applicable to machines for dispensing other beverages.

With reference to the diagram shown in FIG. 1, the machine comprises a pump 1 which receives water. Typically, the pump 1 receives water which is not heated. Typically the pump 1 receives cold water from a pipe and conveys said cold water under pressure to the components downstream.

A preheater 2 is preferably provided downstream of the pump 1. The preheater 2 receives the cold water and heats it to a first temperature. According to one embodiment, the preheater 2 is inserted in a steam boiler 3 configured to create steam and/or hot water (for example for preparing a cappuccino or the like, tea and infusions). This arrangement is particularly advantageous for making use of the energy since the preheater uses (at least partly) the heat of the steam boiler 3.

A mixer device 4 is preferably provided downstream of the preheater 2. In the mixer device 4, the hot water output from the preheater 2 is mixed with the cold water supplied from a branch-off point 10 located downstream of the pump 1. In this way the temperature at the inlet of the coffee group 6 is stabilized, preventing the water from entering at a temperature which is to high or too low. Therefore, according to an advantageous aspect of the present invention, the preheater 2 makes passive use of the heat of the steam boiler 3 to preheat the water entering the coffee group 6, suitably mixed in the mixer device 4.

At the outlet from the preheater 2, the water exits at a first temperature which is higher than 100° C. and variable, while at the outlet of the pump 1 the water exits at a temperature of about 20° C. or in any case at room temperature. The temperature of the water which passes through the pump 1 is typically influenced by the ambient temperature and in any case by the external environment.

Figure 2:
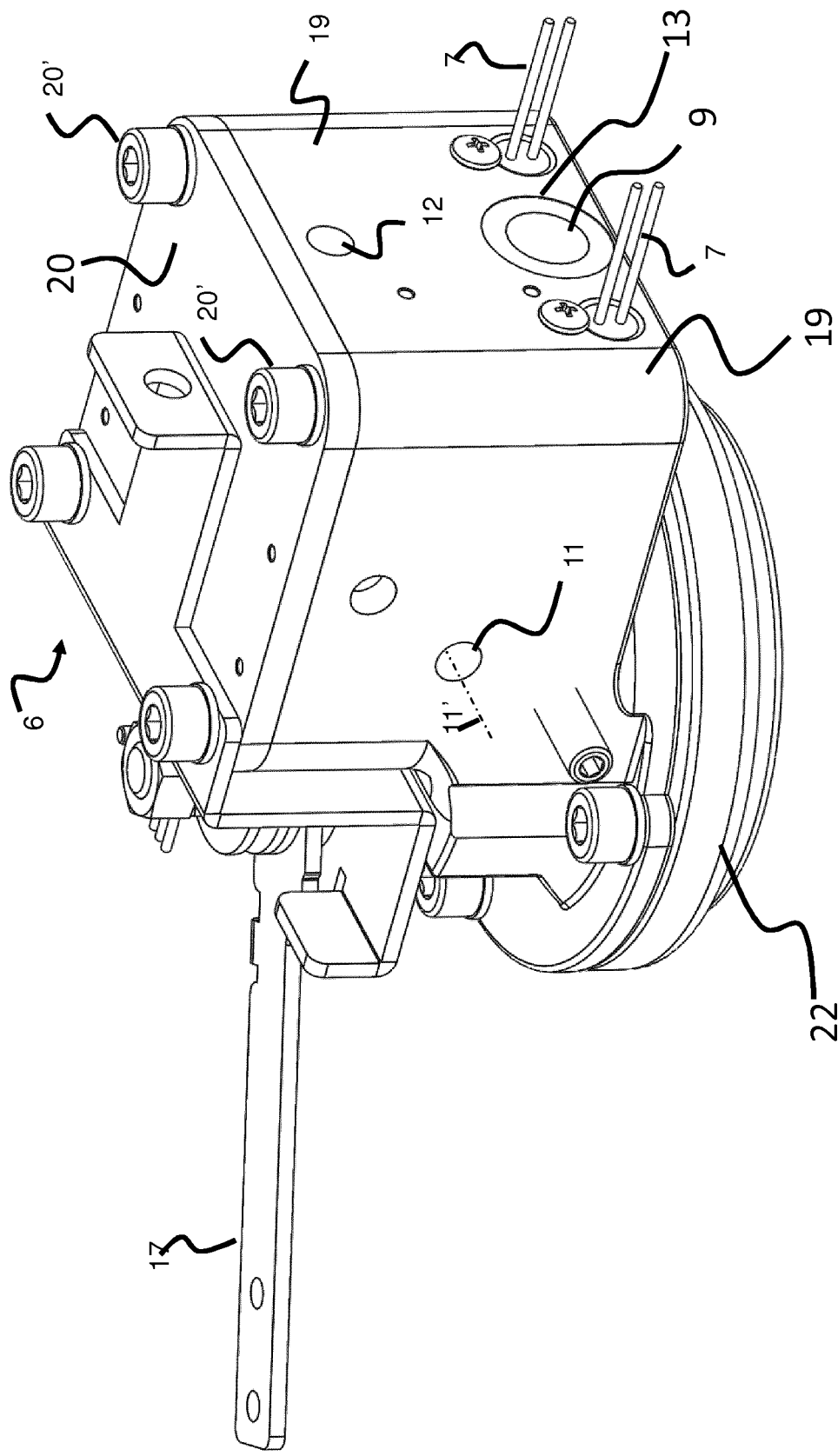
FIGS. 2 and 3 show two different schematic views of the group for supplying hot water according to an embodiment of the invention.
Figure 3:
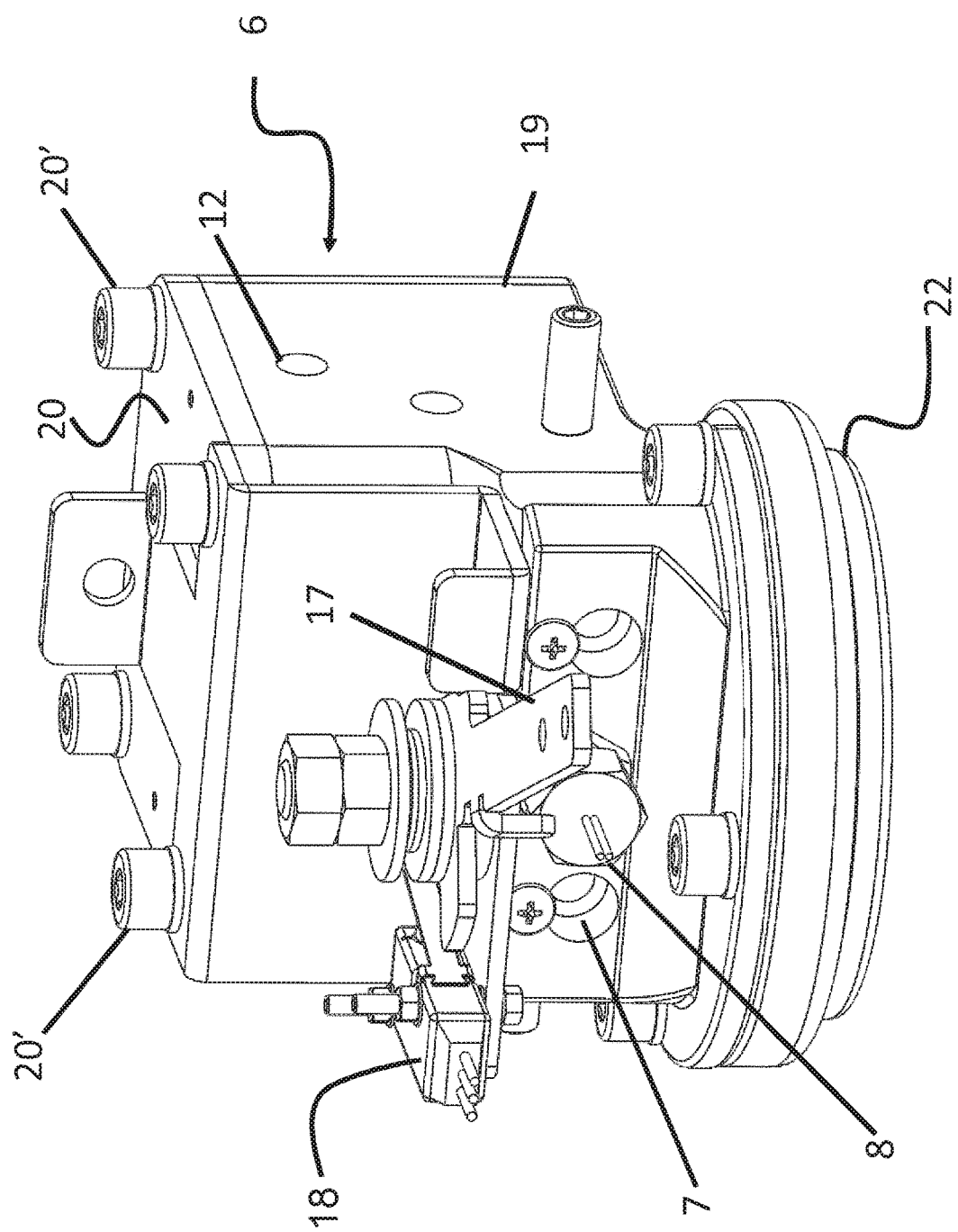
Figure 4:
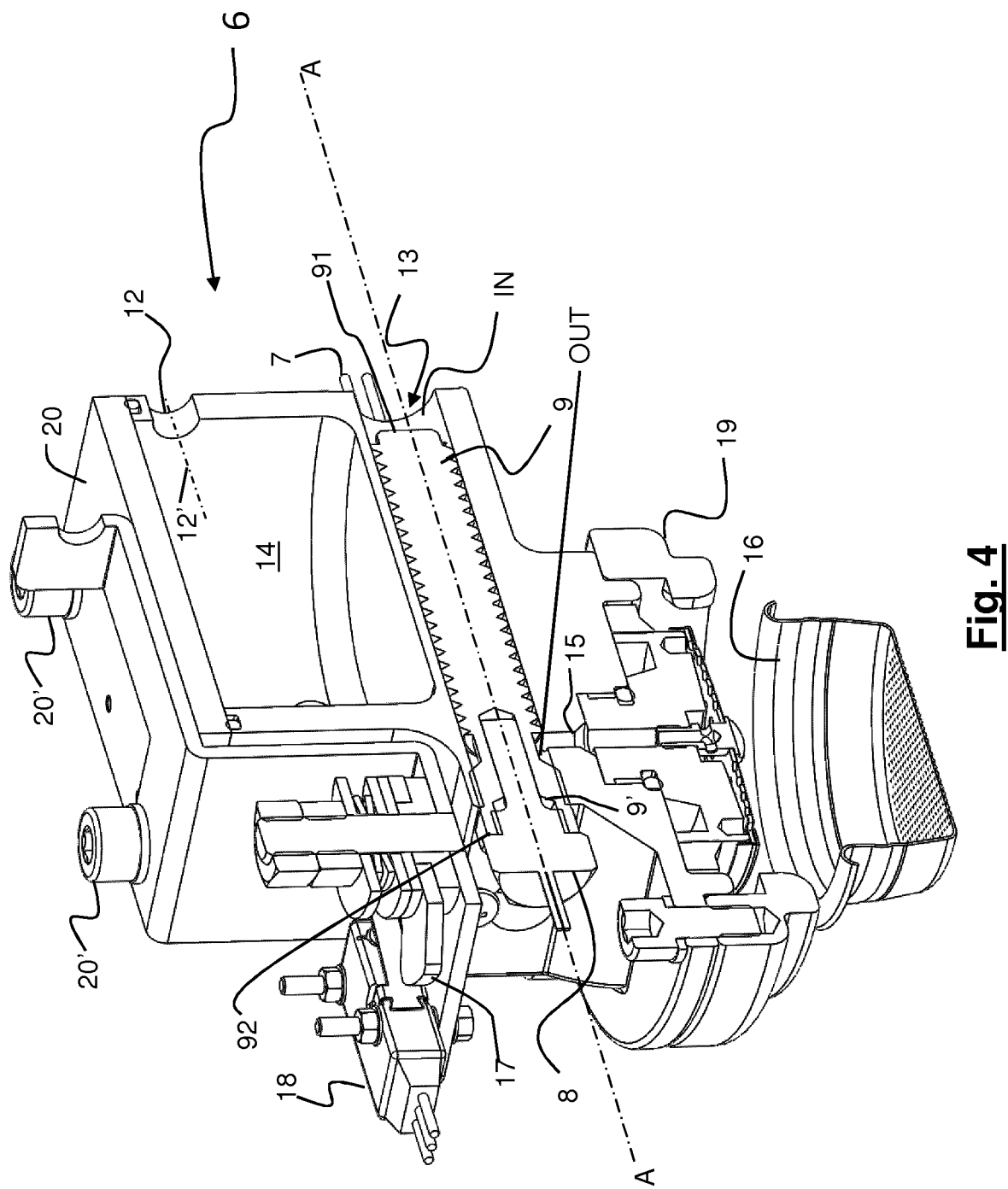
FIG. 4 shows a cross-section through the group according to FIGS. 2 and 3.
Figure 5:
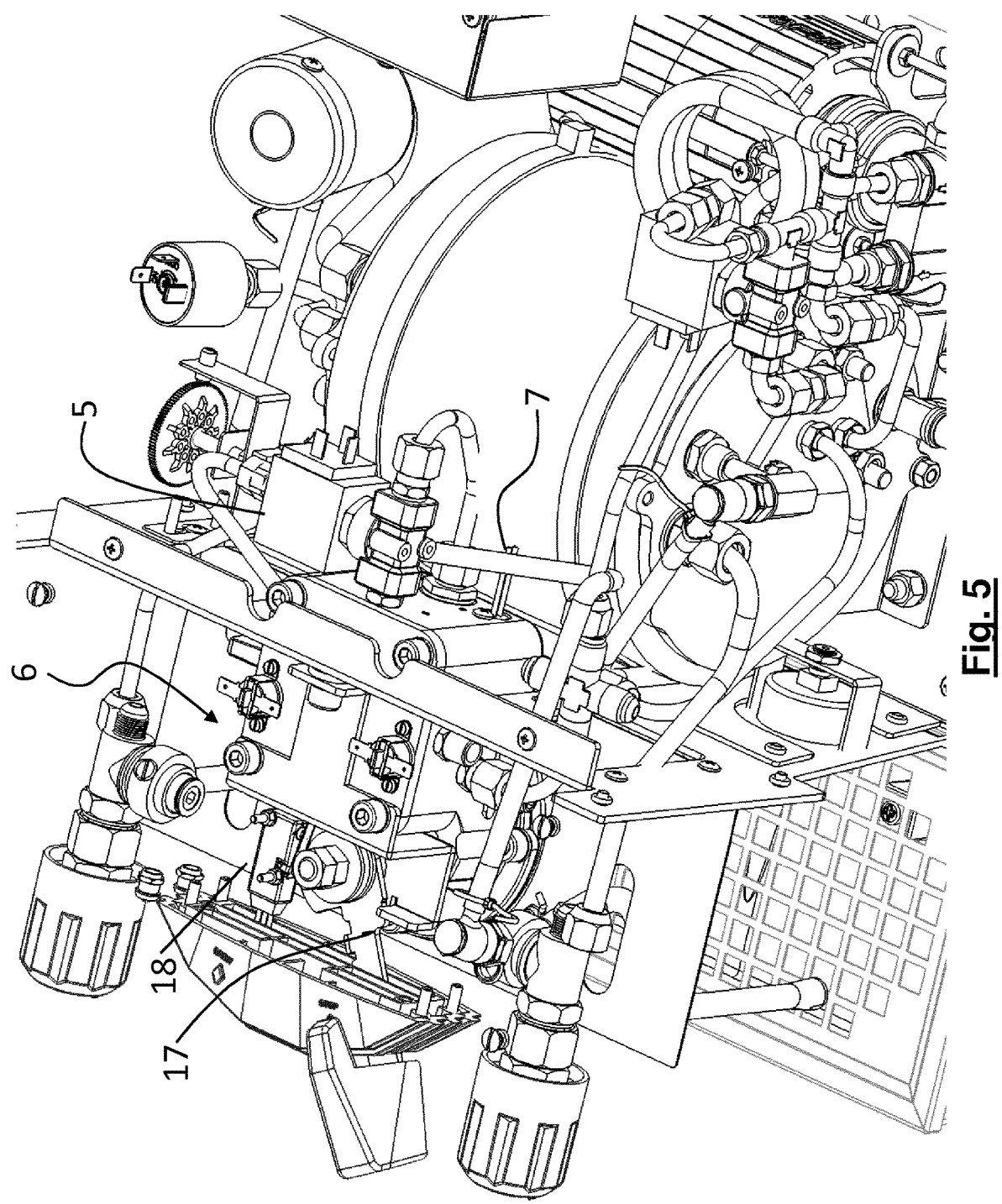
FIG. 5 is a schematic view of a part of the machine for preparing and dispensing a beverage.

FIGS. 2, 3 and 4 show the coffee group 6. The group 6 comprises a block 19 made of metal, for example stainless steel. The metal block 19 has, formed inside it, a accumulation chamber 14 closed at the top by a cover 20 via screws 20' (preferably with a hexagonal socket head) or other known means. The accumulation chamber 14 creates a reserve of hot water for dispensing at a temperature set by the user. The metal block 19 is provided, preferably close to the bottom of the accumulation chamber 14, with heating elements 7 housed inside seats. For example, the heating elements 7 may be in the form of electrical resistors.

The group 6 comprises one or more inlet holes 11 for supplying water to the accumulation chamber 14. Typically the water which feeds the accumulation chamber is supplied from the mixer 4, the preheater 2 or, where present, the branch-off point 10.

The group 6 comprises one or more outlet holes 12 for discharging water from the accumulation chamber 14.

The inlet and outlet holes 11, 12 are preferably situated at different heights with respect to the bottom of the accumulation chamber 14. Preferably, the axes 11' and 12' of the inlet and outlet holes 11, 12 are substantially at right angles to each other. Owing to these arrangements, the temperature stratification effect which may occur inside the accumulation chamber 14 is eliminated.

From the outlet hole(s) 12 the water passes to a solenoid valve 5 and enters again into the group 6 through a hole 13 where it flows along a winding path and its temperature is further raised close to the desired temperature in a precise and controlled manner.

Figure 6:
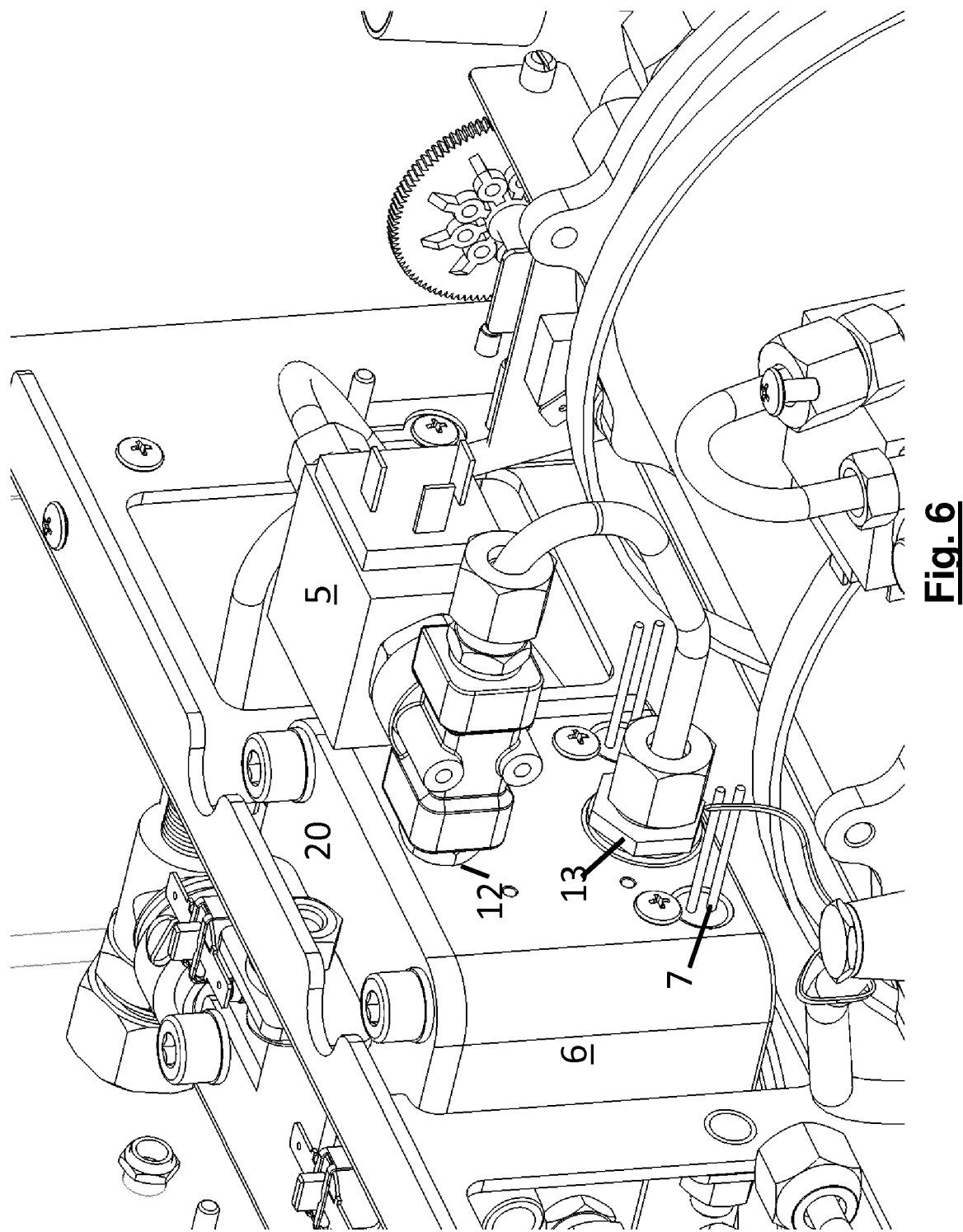
FIG. 6 shows a portion, on a larger scale, of FIG. 5.
Figure 7:
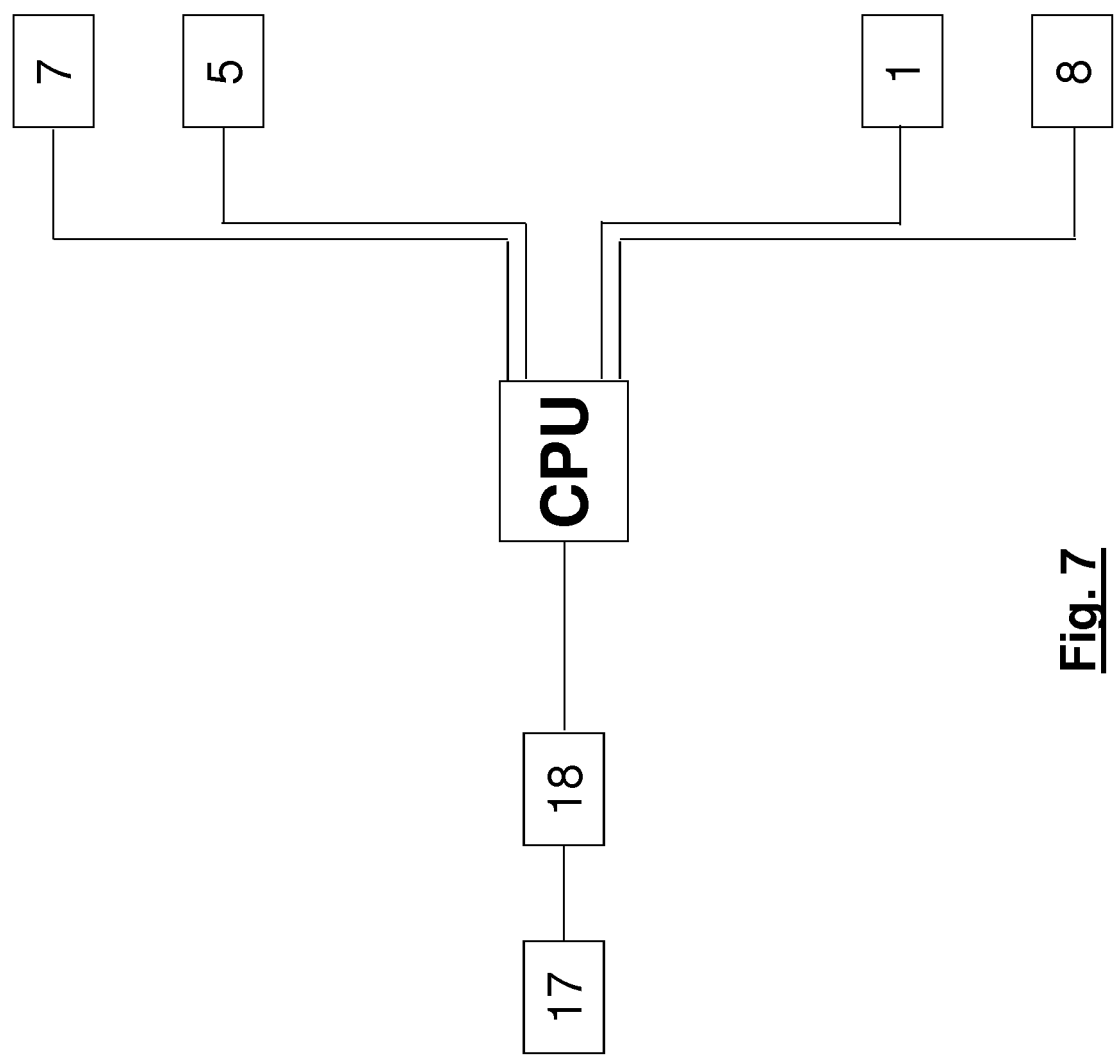
FIG. 7 shows the CPU and the connections to certain components.

Solenoid valves, hydraulic fittings and hoses are provided for operation of the group 6. Some of these are not shown in FIG. 1, but are shown in FIGS. 6 and 7.

Once the winding temperature-adjustment path has been passed along, the water flows through a hole 15 and reaches a brewing chamber 16 containing coffee powder (or the like) to be extracted. The powder is not shown in FIG. 1.

The winding path may be formed in different ways. According to a first preferred embodiment (FIG. 4), the hole 13 in the block 19 is a substantially cylindrical hole with a circular cross-section and, a core 9 with a helical outer surface (that facing the surface of the hole 13) is inserted inside said hole 13. According to a second embodiment, the hole 13 in the block 19 is a threaded hole and a core 9 with a substantially cylindrical outer surface (that facing the thread of the hole 13) is inserted inside said threaded hole 13. According to a third embodiment, the hole 13 in the block 19 is also threaded and a core 9, also with an outer surface (that facing the thread of the hole 13) which is threaded (but with a different thread, for example in terms of pitch or thread type) is inserted inside said threaded hole 13, so as to leave a gap between the thread of the hole 13 and the thread of the core 9. In other words, the winding path may be formed with a helical surface (that of the hole 13 or the core 9) and a cylindrical surface or with two helical surfaces, provided that they have different characteristics so as to leave a space between them.

The form of the winding path realized as described above and shown in the figures offers the advantage that it has a high contact surface area within a small dimensional volume. This allows optimization of the flow path and reduces the spaces occupied inside the device.

The thread which forms the winding path may have a fixed or variable pitch.

According to a first embodiment, the diameter of the hole 13 is about 15 mm, the thread peak and trough diameter of the core 9 is respectively 14.9 mm and 11.4 mm with a thread pitch of 3.5 mm.

Moreover, advantageously, the form of the core 9 shaped in the manner of helical screw allows a head loss to be created such that it is possible to eliminate nozzles with a diameter of the through-hole subject to limescale formation.

Preferably, the core 9 comprises a temperature probe 8. Preferably, the temperature probe 8 is housed inside a special seat 9' at one end of the core 9. Preferably, the seat 9' for the probe is in proximity of the end opposite to that where the water enters into the accumulation chamber 14. In this way there is the advantage that the temperature of the water dispensed may be detected at the point closest to the brewing chamber 16.

As shown in FIG. 4, the inner core 9 comprises a longitudinal axis A-A, a first end 91 at the inlet IN of the heating path 13 and a second opposite end 92; the temperature probe 8 is housed in a seat 9' which extends longitudinally inside the core 9 from the second end 92 towards the first end 91 so that the temperature probe 8 detects the temperature of the water in proximity of the outlet OUT. Preferably, the seat 9' is open towards the outside and the probe may be inserted inside the seat in the manner of a plug. It may be fixed in position by means of interference or by means of a thread. At the same time it may be extracted from the seat in a simple and practical manner so that tests may be carried out or so that it may be replaced as required.

Thus, as stated above, the temperature probe is configured to detect temperature of the heated water which is discharged from the heating path to the brewing chamber. As shown, for example in FIG. 4, the temperature probe is in direct physical contact with the inner core at the outlet of the heating path, the outlet of the heating path being in a direction which is transverse to the longitudinal axis A-A of the inner core. FIG. 4 further shows that the temperature probe, in a plane of the transverse direction at the outlet of the heating path, is engaged by a solid interior of the inner core, e.g., such as by interference or threaded engagement as mentioned above. Moreover, as also shown in FIG. 4, the temperature probe extends longitudinally in physical contact with an interior of the inner core and is intersected in the transverse direction by an axis of the outlet of the heating path.

Preferably the temperature probe 8 is of the negative thermistor (NTC) type made of stainless steel with a diameter of about 6.5 mm.

The temperature probe 8 detects the exact temperature of the water just before it reaches the brewing chamber 16 and preferably sends a signal to a CPU which manages and controls electronically operation of the heating elements 7 present inside the group 6. Owing to this particular form of the core 9 and the characteristic position of the temperature probe 8, the machine is able to ensure the exact value of the temperature set by the user and a high thermal stability of the brewing water. The probe responds promptly to any variations in the temperature by sending a signal to the CPU which activates the heating elements 7.

Advantageously, the temperature probe 8 is able to detect readily and precisely the temperature of the water supplied to the brewing chamber also because it is separated from the outer surface of the core 9 by means of a thin wall, as clearly shown in the cross-section of FIG. 4. In this way the probe is only marginally affected by the thermal inertia.

Advantageously, the group according to the present invention comprises means for discharging the water from the winding path. This feature greatly reduces (and substantially eliminates) the formation of limescale along the winding path. Once extraction of the beverage has been terminated, operation of a microswitch 18 or the like causes the discharging flow of the coffee through the core 9 and then from the three-way solenoid valve 5. Therefore, during dispensing, the core 9 is surrounded by water, while it is empty during the rest phase.

The beverage extraction cycle may be started and stopped by known means (for example a microswitch or button 18). Preferably, the extraction cycle is started by rotating in a first direction a lever 17, connected substantially to the group 6. Preferably, the extraction cycle is stopped by rotating the same lever 17 in the opposite direction to initial operation of the cycle.

According to a preferred embodiment of the present invention, the CPU is programmed to perform pre-brewing in order to extract better the aromas present inside the coffee. When the user activates dispensing of the hot water for brewing (for example by means of operation of the microswitch 18 by moving the lever 17), the CPU opens exclusively the load passage of the solenoid valve 5 for the first few instants without the pump 1 being activated. Only subsequently, once a suitably defined time has lapsed, does the CPU activate also the pump 1. In this way, owing to the overpressure which is created inside the accumulation chamber 14, the infusion water reaches the brewing chamber 16 at a pressure such that it does not "attack" the coffee to be extracted, but in such a way as to perform pre-brewing which is ideal for extracting in the best manner possible the aromas present inside the coffee. Advantageously, the overpressure inside the accumulation chamber may be detected by means of one or more pressure measuring devices 21.

FIG. 7 shows in schematic form the CPU connected to the microswitch 18 operated by the lever 17. It also shows the connections to the pump 1, to the three-way valve 5, to the heaters 7 and to the temperature probe 8. In other embodiments, the CPU may be connected only to one or more of the aforementioned components. The connections may be monodirectional or bidirectional.

According to a preferred embodiment, the group according to the invention may also comprise a diffuser 22 which is removable (for example by means of screws or the like) and can be interchanged with other diffusers having different forms such as to render the coffee group modular and capable of extracting different types of beverages from powder, pods, capsules or the like.

The winding path of the group of the present invention is very efficient because it makes use of the whole length of the core. By way of example, for a helical core with a length of about 10 cm, a path of about 80 cm is created.

The solution according to the present invention is also very advantageous in that discharging of the water may be performed in an easy and reliable manner. This, because the water does not have to cross transversely the core through small holes, but instead flows around the core itself. The pressure losses are reduced and, consequently, the puck of powder (coffee) dries better and there is less accumulation of stagnant discharge water within the winding heating path formed by the hole 13 and the core 9.

The invention claimed is:

1. An apparatus for supplying hot water in a machine for preparing and dispensing a beverage, comprising:
   a block comprising:
      a water accumulation chamber;
      a cover to close the accumulation chamber;
      heating elements; and,
      a heating path;
   wherein the accumulation chamber comprises an inlet for receiving water and an outlet, wherein an axis of the inlet of the accumulation chamber is perpendicular to an axis of the outlet of the accumulation chamber;
   wherein the heating path comprises a heating path inlet for receiving water from the outlet of the accumulation chamber and a heating path outlet for dispensing heated water into a brewing chamber for preparing a beverage;
   wherein the heating elements are configured to heat water both in the accumulation chamber and in the heating path;
   wherein the heating path comprises a path bounded by an outer surface heated by the heating elements and an inner core;
   wherein the inner core comprises a temperature probe for detecting a temperature of the heated water; wherein the inner core comprises a longitudinal axis, a first end at the inlet of the heating path, and the outlet for dispensing heated water into the brewing chamber at a second opposite end; and
   wherein the temperature probe is housed in a seat and wherein the temperature probe extends longitudinally inside the inner core from the second end towards the first end so that the temperature probe is in direct physical contact with an interior of the inner core and is intersected in a direction transverse to the inner core longitudinal axis by an axis of the outlet for dispensing heated water into the brewing chamber whereby the temperature probe detects the temperature of the water in proximity of the outlet for dispensing heated water into the brewing chamber, the temperature probe not being in contact with the heated water nor influencing flow of the heated water but having heat of the water transferred thereto by a wall of the inner core with which the temperature probe is in the direct physical contact; and
   wherein an axis of the outlet of said accumulation chamber is parallel to the longitudinal axis of the inner core.

2. The apparatus according to claim 1, wherein the heating path is a winding path formed by a helical surface.

3. The apparatus according to claim 2, wherein the helical surface is formed on an outer surface of said inner core.

4. The apparatus according to claim 1, wherein said heating path extends completely outside of said inner core without passing through said inner core.

5. The apparatus according to claim 2, further comprising a solenoid valve between the outlet of said accumulation chamber and the inlet of said winding path.

6. The apparatus according to claim 1, wherein the inlet of said accumulation chamber is at a different height than the outlet of said accumulation chamber.

7. The apparatus according to claim 1, further comprising a removable and interchangeable diffuser such as to render the apparatus modular and configurable to extract different types of beverages.

8. The apparatus according to claim 1, further comprising a lever rotatable in a first direction so as to start a beverage extraction cycle and in a second direction so as to stop said beverage extraction cycle.

9. An apparatus for supplying hot water in a machine for preparing and dispensing a beverage, comprising:
   a water accumulation chamber comprising an inlet for receiving water and an outlet, wherein an axis of the inlet of the accumulation chamber is perpendicular to an axis of the outlet of the accumulation chamber;
   a brewing chamber;
   a heating path comprising:
      a heating path wall forming an outer surface;
      a heating path inlet configured to receive water from the outlet of the water accumulation chamber;
      a heating path outlet configured to dispense heated water into the brewing chamber;
      an inner core having a longitudinal axis and configured to provide a winding path for water which is received at the inlet of the heating path and which travels between the inner core and the heating path wall to the outlet of the heating path, the outlet of the heating path being configured to direct the heated water in a direction which is transverse to the longitudinal axis of the inner core;
   a temperature probe configured to detect temperature of the heated water which is discharged from the heating path to the brewing chamber, the temperature probe extending longitudinally in direct physical contact with an interior of the inner core and being intersected in the transverse direction by an axis of the outlet of the heating path, the temperature probe not being in contact with the heated water nor influencing flow of the heated water but having heat of the water transferred thereto by a wall of the inner core with which the temperature probe is in the direct physical contact;
   a heater configured to heat the water in the heating path; and
   wherein an axis of the outlet of said accumulation chamber is parallel to the longitudinal axis of the inner core.

10. The apparatus of claim 9, wherein the heater is configured to heat the water both in the heating path and in the water accumulation chamber.

11. The apparatus of claim 1, wherein the inner core comprises a recessed length resulting in the wall being a thin wall at the outlet for dispensing heated water into the brewing chamber.

12. The apparatus of claim 9, wherein the inner core comprises a recessed length resulting in the wall being a thin wall at the outlet for dispensing heated water into the brewing chamber.

* * * * *